United States Patent
Lee

(10) Patent No.: US 6,748,029 B1
(45) Date of Patent: Jun. 8, 2004

(54) APPARATUS FOR RESTORING CARRIER WAVE AND METHOD THEREFOR

(75) Inventor: Jin Kyoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 720 days.

(21) Appl. No.: 09/641,676

(22) Filed: Aug. 18, 2000

(30) Foreign Application Priority Data

Aug. 19, 1999 (KR) ........................................ 1999/34368

(51) Int. Cl.⁷ .............................................. H04L 27/16
(52) U.S. Cl. ...................................................... 375/326
(58) Field of Search ................................ 375/270, 277, 375/34, 326, 317, 319, 345; 329/357; 455/47, 204

(56) References Cited

U.S. PATENT DOCUMENTS 5,710,795 A * 1/1998 Tsumura ..................... 375/317
6,545,728 B1 * 4/2003 Patel et al. .................. 348/725

* cited by examiner

Primary Examiner—Stephen Chin
Assistant Examiner—Kevin Kim
(74) Attorney, Agent, or Firm—Birch, Stewart, Kolasch & Birch, LLP

(57) ABSTRACT

A carrier wave restoring apparatus which is capable of restoring a carrier wave quickly and accurately by selectively controlling an operation of a matching filter. The carrier wave restoring apparatus comprises a filtering unit for filtering a broadcast signal and outputting a match filtering signal; a multiplier for receiving the matching filtering signal and generating an 'I' (Inphase) signal and a 'Q' (Quadrature) signal; an error detector for accumulating a sign bit of a DC component of the 'I' signal, comparing it with a predetermined threshold, and outputting a control signal to the filtering unit; and a gain controlling unit for receiving the 'I' signal and the 'Q' signal from the multiplier and outputting a gain control signal to control a carrier wave restoration velocity according to the control signal of the error detector.

11 Claims, 5 Drawing Sheets

US 6,748,029 B1

APPARATUS FOR RESTORING CARRIER WAVE AND METHOD THEREFOR

BACKGROUND OF THE INVENTION

1. Field of the Invention

The present invention relates to an apparatus for restoring carrier waves and a method therefor in receiving a VSB signal, and more particularly, to an apparatus for restoring carrier waves by selectively controlling an operation of a matching filter which inputs broadcast signals and a method therefor.

2. Description of the Background Art

FIG. 1 is a schematic block diagram of a carrier wave restoring apparatus using an analog signal in accordance with a conventional art.

As shown in the drawing, the carrier wave restoring apparatus using an analog signal processing method includes: a frequency synthesizer 1 for generating a first local oscillating frequency to tune a channel frequency desired by a user; a tuner 2 for receiving a broadcasting signal received by an antenna, turning a frequency of the received broadcasting signal according to the first local oscillating frequency outputted from the frequency synthesizer 1 and outputting a tuned signal of which gain has been controlled by an auto gain control (AGC); a SAW filter for receiving the signal outputted from the tuner 2 and band-pass filtering it; an intermediate frequency amplifier 4 for amplifying the band-pass filtered signal to an intermediate frequency(IF), controlling its gain, and outputting the IF signal as gain-controlled and amplified; a reference frequency oscillator 5 for generating a local oscillation frequency signal having a certain frequency, to generate an 'I (In-phase)' signal and a 'Q (Quadrature)' signal from the amplified IF signal outputted from the IF amplifier 4; a 90° shifter 5-1 for shifting a phase of the local oscillation frequency signal outputted from the reference frequency oscillator 5; a multiplier 4-1 for multiplying the IF signal outputted from the IF amplifier 4 and the signal outputted from the 90° shifter 5-1, to output an 'I' signal; a multiplier 4-2 for multiplying the IF signal and the local oscillation frequency signal outputted from the reference frequency oscillator 5, to output a 'Q' signal; an automatic frequency control(AFC) filter 6 for detecting an error component of a carrier wave from the 'I' signal outputted from the multiplier 4-1; a limiter 7 for receiving and processing the signal outputted from the AFC filter 6 and outputting pulse signals; a multiplier 7-1 for multiplying the pulse signals outputted from the limiter 7 and the 'Q' signal outputted from the multiplier 4-2; an automatic phase control (APC) filter 8 for detecting a frequency and a phase component from the signal outputted from the multiplier 7-1 and compensating the phase component; and a voltage control oscillator (VCO) 9 for receiving the phase compensated signal outputted from the APC filter 8 and outputting a second local oscillation frequency signal to compensate the carrier wave into the tuner 2.

The carrier wave restoring apparatus using an analog signal processing method as shown in FIG. 1, however, is disadvantageous in that when the carrier waves is demodulated in a baseband by using an analog signal processing method, it is difficult to control the phase difference between the 'I' and 'Q' channels precisely by 90°, analog circuit elements are easily degraded as they are susceptible to temperature characteristics, and the analog circuit elements are hardly integrated either.

Meanwhile, a quadruple orthogonal amplitude modulation(QOAM) method according to a conventional art, since the gains of the 'I' signal and the 'Q' signal and the phase difference therebetween should be controlled equivalently, does not perform to restore a carrier wave easily, but includes many steps to do.

Thus, in an effort to solve the problem, a method for demodulating carrier waves in a digital region has been proposed.

FIG. 2 is a schematic block diagram of a carrier wave restoring apparatus using digital signal processing method in accordance with another conventional art.

As shown in the drawing, the carrier wave restoring apparatus includes: a tuner 11 for tuning a frequency corresponding to a channel desired by a user; a SAW filter 12 for receiving a turning signal from the tuner 11 and passing a certain band; a multiplier 12-1 for multiplying the signal outputted from the SAW filter 12 by a local oscillation frequency signal, and outputting an analog signal having a certain frequency; an A/D converter 13 for converting the analog signal outputted from the multiplier 12-1 to a digital signal; an SRC filter 14 for detecting and outputting only a signal existing in a certain band of the digital signal, which matches the frequency of the inputted signal thereinto; a Hilbert 16 for receiving the signal from the SRC filter 14, delaying a phase of 90° and outputting a 'Q' signal; a delay 15 for delaying the signal outputted from the SRC filter 14 until the 'Q' signal is outputted from the Hilbert 16, and then outputting an 'I' signal; a complex multiplier 17 for receiving the 'I' and 'Q' signals, multiplying them by a carrier wave, and outputting an 'I' and 'Q' signal of baseband; an infinitive impulse response (IIR) filters 18 and 20 for filtering the 'I' and 'Q' signals outputted from the complex multiplier 17, respectively; a delay/limiter 19 for delaying the signal outputted from the IIR filter 18 and outputting pulse signals; a multiplier 19-1 for multiplying the pulse signals outputted from the delay/limiter 19 by the signal outputted from the IIR filter 20, and outputting an error component of a frequency and a phase; a loop filter 21 for accumulating the error component outputted from the multiplier 19-1; and a numerically controlled oscillator 22 for receiving the accumulated error component outputted from the loop filter 21, and outputting 0° and 90° phase signals to the complex multiplier 17, so as for the complex multiplier 17 to compensate the error in the carrier wave.

The differences between the carrier wave restoring apparatus using the analog signal processing method and the carrier wave restoring apparatus using the digital signal processing method are in that, the former compensates the tuning frequency to restore the carrier wave by the voltage control oscillator 9 as used in the latter of FIG. 1 and the latter compensates the frequency by the NCO 22 of FIG. 2.

Of the apparatuses, in the aspect of integrated circuit, the carrier wave restoring apparatus using the digital signal processing method is considered to be better than the carrier wave restoring apparatus using the analog signal processing method.

FIG. 3 is a schematic block diagram of a carrier wave restoring apparatus using a digital signal in accordance with another conventional art, which additionally includes A/D converters for converting signals outputted from the multipliers 4-1 and 4-2 to digital signals and outputting an 'I' signal and 'Q' signal, respectively, in the carrier wave restoring apparatus using the analog signal processing method of FIG. 1.

The carrier wave restoring apparatus using the digital signal processing method of FIG. 3 separates an IF signal into an 'I' channel and a 'Q' channel in the analog region, converts them to digital signals by using the two A/D converters 31 and 32, so that the carrier wave is restored by the signals from the VCO 9 after processing the converted signals.

However, the carrier wave restoring apparatuses using the analog and digital signals processing methods still have problems that, in case that the a channel of a frequency is being received is changed or in case that power is supplied to the system at an initial stage (initial mode), a carrier wave deviation occurs, and when the thusly occurred carrier wave passes the matching filter, the carrier wave component is attenuated, which is hardly restored. In addition, the same problem also arises in the case that a carrier wave deviation occurs due to the aging of the analog circuit elements. Especially, the conventional carrier wave restoring apparatuses as described above is not capable of restoring a carrier wave as the carrier wave deviation possibly occurring due to various factors is greater.

SUMMARY OF THE INVENTION

Therefore, an object of the present invention is to provide an apparatus for restoring carrier waves accurately and quickly by selectively operating a matching filter which inputs broadcast signal and a method therefor.

Another object of the present invention is to provide an apparatus for restoring carrier waves and a method therefor in which when a broadcast signal is received by a receiver, at an initial stage, the broadcast signal is bypassed through a matching filter of the receiver and restored carrier waves, and when a magnitude of a accumulated sign bit of the carrier wave is greater than that of a predetermined threshold, the matching filter is operated, so that the signal outputted from the matching filter is processed to restore the carrier wave.

To achieve these and other advantages and in accordance with the purpose of the present invention, there is provided an apparatus for restoring carrier waves comprising: a filtering unit for filtering a broadcast signal and outputting a match filtering signal; a multiplier for receiving the matching filtering signal and generating an 'I' (Inphase) signal and a 'Q' (Quadrature) signal; an error detector for accumulating a sign bit of a DC component of the 'I' signal, comparing it with a predetermined threshold, and outputting a control signal to the filtering unit; and a gain controlling unit for receiving the 'I' signal and the 'Q' signal from the multiplier and outputting a gain control signal to control a carrier wave restoration velocity according to the control signal of the error detector.

To achieve these and other advantages and in accordance with the purpose of the present invention, there is provided a method for restoring carrier waves comprising the steps of: match filtering a broadcast signal; generating an 'I' (Inphase) signal and a 'Q' (Quadrature) signal of the match filtering signal; comparing a magnitude of a sign bit of a DC component of the 'I' signal with a predetermined threshold, and outputting a control signal; and generating a gain control signal to control a carrier wave restoration velocity according to the control signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
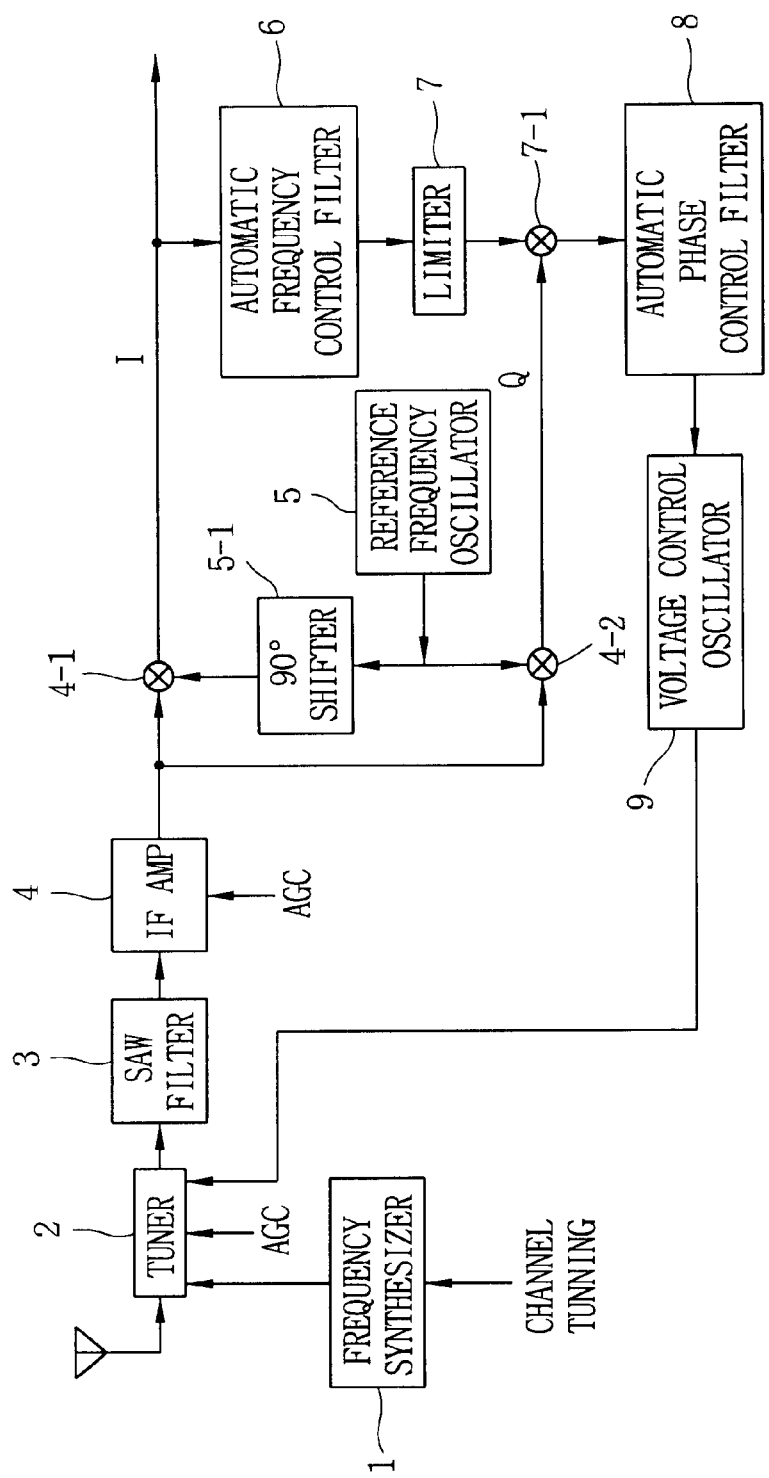
FIG. 1 is a schematic block diagram of a carrier wave restoring apparatus using an analog signal processing method in accordance with a conventional art.
Figure 2:
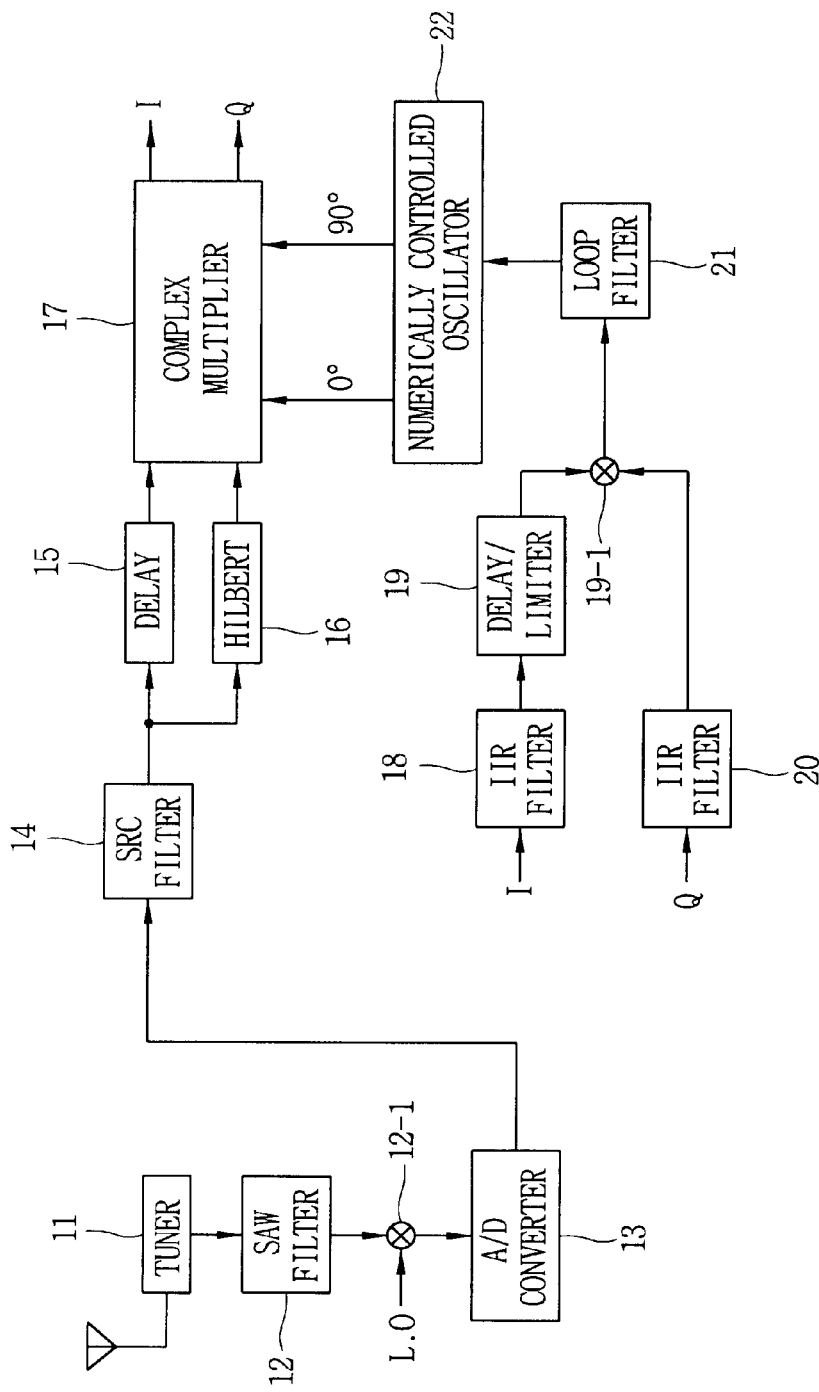
FIG. 2 is a schematic block diagram of a carrier wave restoring apparatus using a digital signal processing method in accordance with one example of a conventional art.
Figure 3:
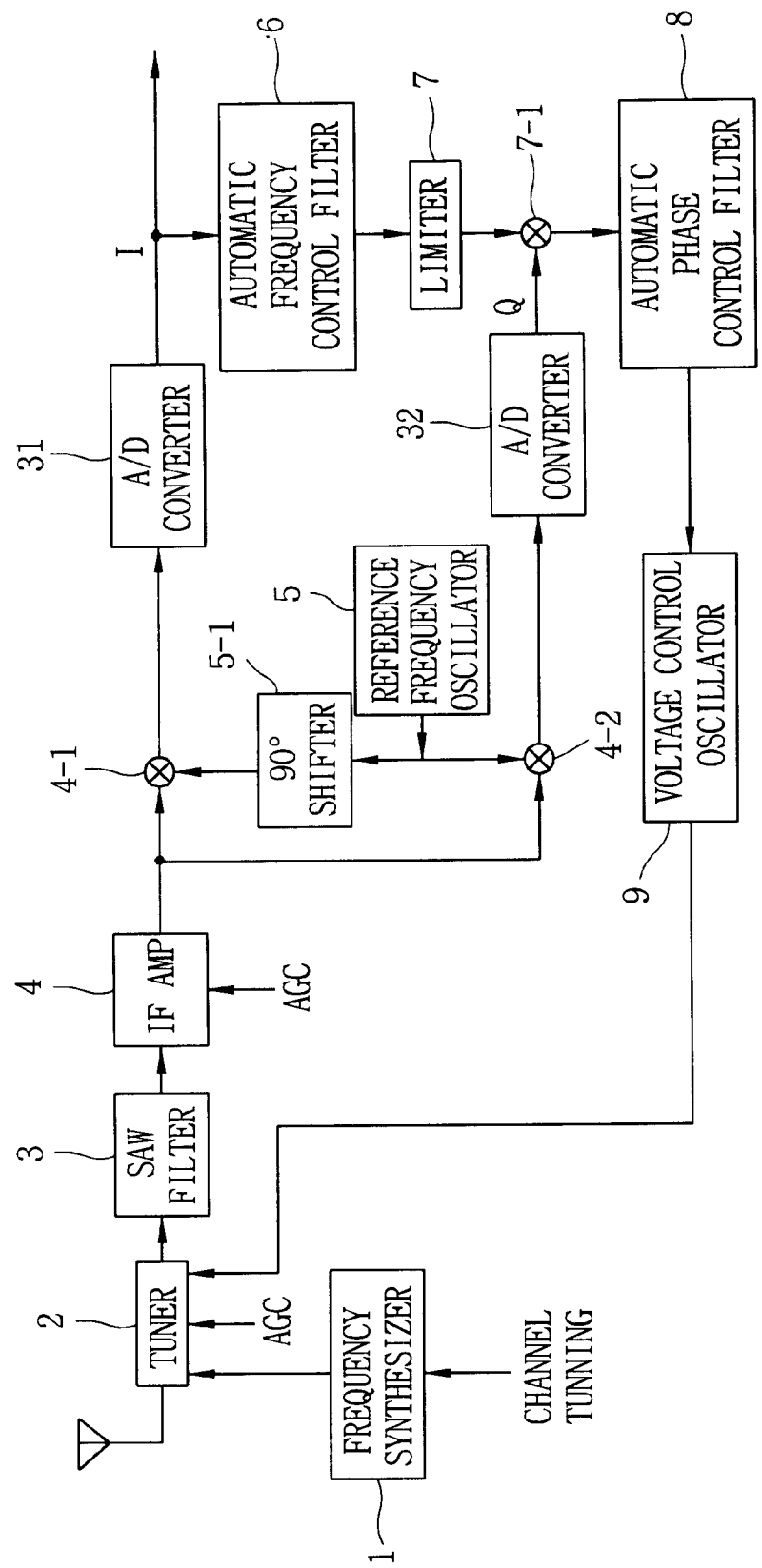
FIG. 3 is a schematic block diagram of a carrier wave restoring apparatus using a digital signal processing method in accordance with another example of a conventional art.
Figure 4:
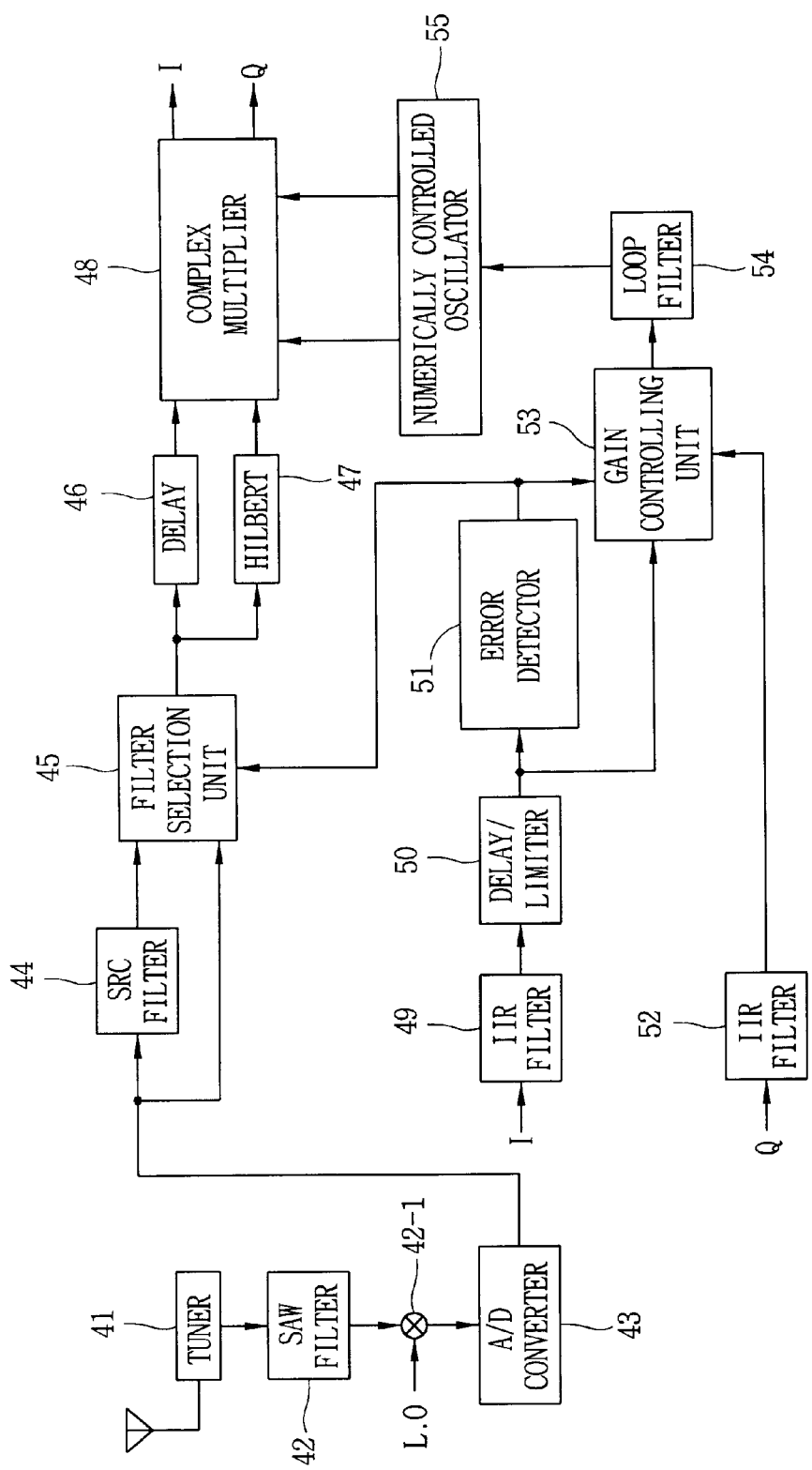
FIG. 4 a schematic block diagram of a carrier wave restoring apparatus using a digital signal processing method in accordance with the present invention.

FIG. 4 a schematic block diagram of a carrier wave restoring apparatus using a digital signal processing method in accordance with the present invention.

As shown in the drawing, the carrier wave restoring apparatus using a digital signal processing method includes a tuner 41 for tuning a frequency corresponding to a channel desired by a user; a SAW filter 42 for receiving a turning signal from the tuner 41 and passing a certain signal therethrough; a multiplier 42-1 for multiplying the signal outputted from the SAW filter 42 by a local oscillation frequency signal, and outputting an analog signal having a certain frequency; an A/D converter 43 for converting the analog signal outputted from the multiplier 42-1 to a digital signal; an SRC filter 44 for detecting and outputting a signal existing in a certain band of the digital signal, which matches a frequency of the signal of the A/D converter 43; a filter selection unit 45 for receiving the output signal of the SRC filter 44 and the output signal of the A/D converter 43 according to a control signal and selectively outputting either one; a Hilbert 47 for receiving the signal outputted from the filter selector 45, delaying 90° phase and outputting a 'Q' signal; a delay unit 46 for delaying the signal outputted from the filter selector 45 until the 'Q' signal is outputted from the Hilbert 47, and then outputting an 'I' signal; a complex multiplier 48 for receiving the 'I' and 'Q' signals of the delay 46 and the Hilbert 47 respectively, restoring a carrier wave, and outputting an 'I' and a 'Q' signal of baseband signals; an infinitive impulse response (IIR) filters 49 and 52 for filtering the 'I' and 'Q' signals outputted from the complex multiplier 48, respectively; a delay/limiter 50 for delaying the signal outputted from the IIR filter 48 and outputting a pulse signal; an error detector 51 for receiving the pulse signal from the delay/limiter 50 and outputting the control signal to the filter selector 45; a gain controlling unit 53 for receiving the pulse signal from the delay/limiter 50 and the signal from the IIR filter 52, and outputting a gain control signal according to the control signal outputted from the error detector 51; a loop filter 54 for accumulating the gain control signal outputted from the gain controlling unit 53; a numerically controlled oscillator 55 for receiving the gain control signal from the loop filter 54 and outputting 0° and 90° phase signals to the complex multiplier 48, so as for the complex multiplier 48 to compensate a carrier wave.

Figure 5:
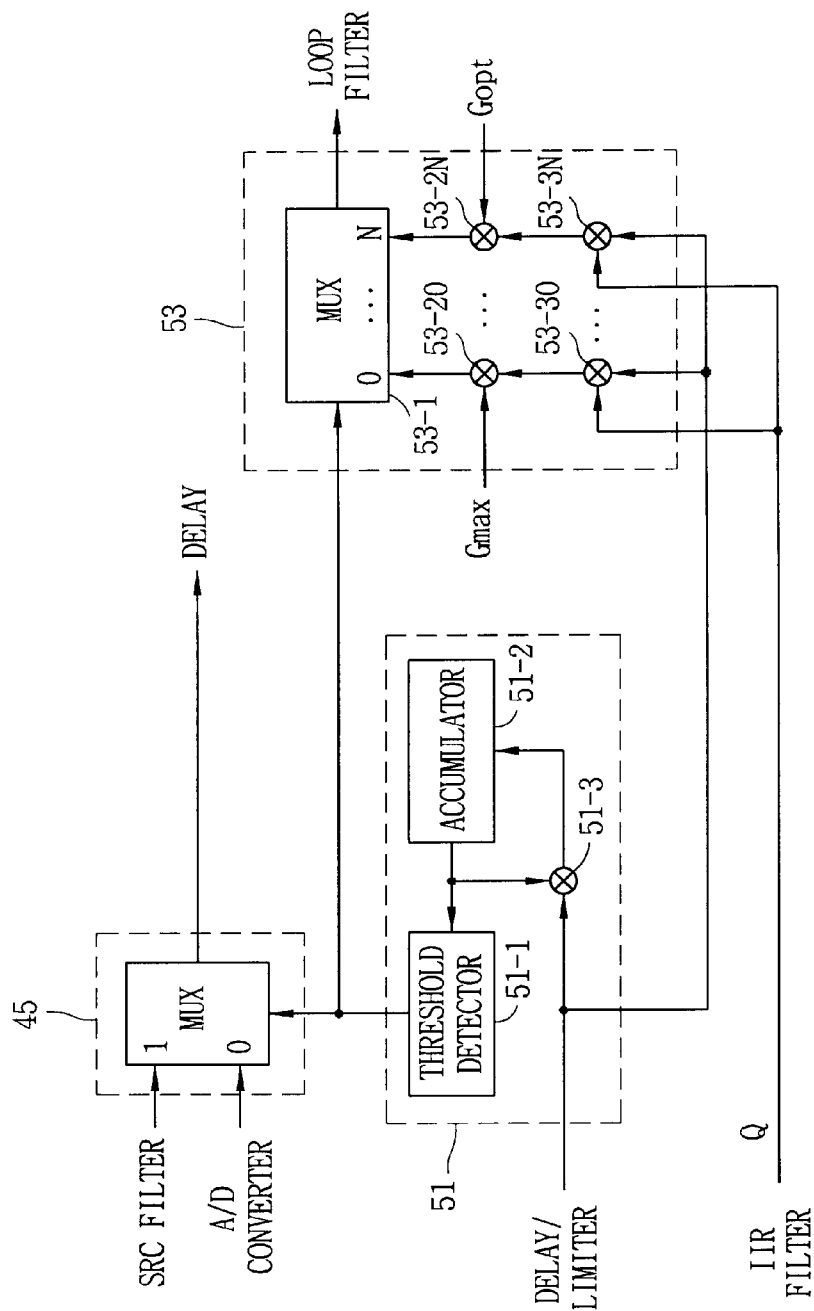
FIG. 5 is a detailed view of an error detector, a filter selector and a gain controlling unit of FIG. 4 in accordance with the present invention.

FIG. 5 is a detailed view of the error detector 51, the filter selection unit 45 and the gain controlling unit 53 of FIG. 4 in accordance with the present invention.

The filter selector 45 may use a multiplexer, for example.

The error detector 51 includes an adder 51-3 for adding a sign bit of the signal outputted from the delay/limiter 50 and a previously accumulated sign bits; an accumulator 51-2 for accumulating the sign bits outputted from the adder 51-3; and a threshold detector 51-1 for receiving the accumulated sign bits outputted from the accumulator 51-2, comparing them with a predetermined threshold, and outputting the control signal to the filter selection unit 45 and the gain controlling unit 53.

The gain controlling unit 53 includes first multipliers (53-30, ... 53-3N) for multiplying the signals outputted from the delay/limiter 50 by the signal outputted from the infinitive impulse response (IIR) filter 52; second multipliers (53-20, ... 53-2N) for multiplying the signals outputted from the first multipliers (53-30, ... 53-3N) by gains which are predetermined maximum or optimum gains; and a multiplexer 53-1 for selectively outputting the output signals of the second multipliers (53-20, ... , 53-2N) according to the control signal outputted from the threshold detector 51.

Wherein the number of the first and the second multiplexers ({53-30, ... 53-3N} or {53-20, ... 53-2N}) are the same that of the thresholds set in the threshold detector 51-1.

The operation of the carrier wave restoring apparatus in accordance with the present invention constructed as described above will now be explained as follows.

At the initial time when a broadcasting signal, for example VSB signal, is received from the antenna, in order to maximize the gain of the carrier wave, the carrier wave restoring apparatus controls the filter selection unit 45 so as for the signal outputted from the A/D converter 43 to bypass the SRC filter, and the gain controlling unit 53 is controlled to select a maximum gain value Gmax in a range that the frequency phase locked loop (FPLL) is stably operated, thereby quickly restoring the carrier wave.

As time elapses, the IIR filter 49 receiving the 'I' signal from the complex multiplier 48 outputs an output signal having a DC value generated by a pilot of a VSB signal. Then, the output signal is received by the delay/limiter 50, and the delay/limiter 50 outputs pulse signals. Upon receipt of the pulse signals from the delay/limiter 50, the accumulator 51-2 of the error detector 51 receives the sign bits of the pulse signals and accumulates them. If the accumulated sign bits are smaller than the threshold (i.e., 1 kHz) previously set in the threshold detector 51-1, the threshold detector 51-1 concurrently outputs the control signal both to the filter selection unit 45 to bypass the broadcasting signal through the SRC filter 44 and to the multiplexer 53-1 of the gain controlling unit 53 to output the maximum gain.

At this time, the greater the gain of the gain controlling unit 53 is, the quicker the restoring velocity of the carrier wave becomes. Nevertheless, since the phase jitter inserted into the baseband signal is also increased, the performance of the carrier wave restoring apparatus is accordingly degraded.

Therefore, when the carrier wave is restored to some extent, the gain of the gain controlling unit 53 is controlled to be small again. That is, in case that the magnitude of the accumulated sign bits in the accumulator 51-2 are greater than the threshold as set by the threshold detector 51-1, the threshold detector 51-1 simultaneously outputs a control signal both to the filter selection unit 45 to pass the output signal of the A/D converter 43 through the SRC filter 44 and to the multiplexer 53-1 of the gain controlling unit 53 to output an optimum gain (Gopt).

As so far described, according to the carrier wave restoring apparatus of the present invention, at the initial stage that the receiver is receiving a signal, since the SRC filter is not operated, the attenuation phenomenon of the carrier wave gain typically occurring when a received signal passes through the SRC filter is prevented. Also, in case that the restoration of the carrier wave is smaller than the threshold, the gain is again controlled to restore the carrier wave, so that the carrier wave can be accurately and quickly restored.

The above embodiment of the carrier wave restoring apparatus of the present invention took an example that the gain is controlled with two step to compensate the carrier wave with the maximum gain Gmax and the optimum gain Gopt, for example. In this respect, in order to more stably operate the carrier wave storing apparatus, the gains of the gain controlling unit 53 may be controlled with multi-step.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A carrier wave restoring apparatus comprising:
   a filtering unit for filtering a broadcast signal and outputting a match filtering signal;
   a multiplier for receiving the matching filtering signal and generating an inphase signal 'I' and a quadrature signal 'Q';
   an error detector for accumulating a sign bit of a DC component of the 'I' signal, comparing it with a predetermined threshold, and outputting a control signal to the filtering unit; and
   a gain controlling unit for receiving the 'I' signal and the 'Q' signal from the multiplier and outputting a gain control signal to control a carrier wave restoration velocity according to the control signal of the error detector.

2. The apparatus according to claim 1, wherein the broadcast signal is a VSB signal.

3. The apparatus according to claim 1, wherein the filtering unit comprising:
   a matching filter for receiving the broadcast signal, matching the frequency of the broadcasting to a predetermined frequency and outputting a match filtering signal; and
   a multiplexer for selectively outputting the broadcast signal and the match filtering signal outputted from the matching filter to the multiplier according to the control signal outputted from the error detector.

4. The apparatus according to claim 3, wherein the matching filter is a band-pass filter.

5. The apparatus according to claim 1, the error detector comprising:
   an adder for adding a sign bit outputted from the 'I' signal and previously accumulated sign bits;
   an accumulator for accumulating the sign bits outputted from the adder; and
   a threshold detector for comparing the sign bits accumulated in the accumulator and the predetermined threshold, and outputting the control signal.

6. The apparatus according to claim 1, wherein the gain controlling unit comprising:

first multipliers for multiplying the sign bit of the 'I' signal by the 'Q' signal;

second multipliers for multiplying the signals outputted from the first multipliers by pre-set gains; and a multiplexer for selectively outputting the output signals of the second multipliers according to the control signal outputted from the error detector.

7. The apparatus according to claim 6, wherein the number of the first or second multipliers are the same of that of the predetermined thresholds.

8. The apparatus according to claim 1, wherein the control signal control, if the sign bits accumulated in the accumulator is smaller than a predetermined threshold, controls that the filtering unit outputs the broadcast signal which is not match-filtered and that the gain controlling unit outputs a maximum gain control signal, and if the sign bit accumulated in the accumulator is greater than the predetermined threshold, controls that the filtering unit filters the broadcasting signal and outputs the match filtering signal and that the gain controlling unit outputs an optimum gain control signal.

9. A method for restoring a carrier wave, comprising the steps of:

match filtering a broadcast signal;

generating an inphase signal 'I' and a quadrature signal 'Q' of a match filtering signal;

comparing a magnitude of a sign bit of a DC component of the 'I' signal with a predetermined threshold, and outputting a control signal; and generating a gain control signal to control a carrier wave restoration velocity according to the control signal;

wherein the match filtering further comprises bypassing the broadcast signal when the magnitude of the sign bit is greater than the predetermined threshold.

10. The method for restoring a carrier wave according to claim 9, wherein said generating the gain control signal generates the maximum when the magnitude of the sign bit is greater than the predetermined threshold.

11. The method for restoring a carrier wave according to claim 9, wherein said threshold is set a number of values.

* * * * *